United States Patent [19]

Haas, Sr. et al.

[11] Patent Number: 4,710,117

[45] Date of Patent: Dec. 1, 1987

[54] APPARATUS FOR PLACING CONFECTIONERY WAFER PIECES INTO MOLDING DEPRESSIONS OF CASTING MOLDS

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 844,835

[22] Filed: Mar. 27, 1986

Related U.S. Application Data

[63] Continuation-in-part of Ser. No. 315,285, Oct. 27, 1981, abandoned.

[30] Foreign Application Priority Data

Oct. 27, 1980 [AT] Austria ............................... 5302/80
Apr. 3, 1985 [AT] Austria ............................... 1015/85

[51] Int. Cl.⁴ ................................................. B29D 3/00
[52] U.S. Cl. ............................. 425/126 R; 99/450.7; 198/693; 425/229; 425/231; 426/306
[58] Field of Search ............... 99/450.7; 198/692, 693, 198/420, 480; 425/117, 226, 126 R, 126 S, 229, 231; 426/94, 103, 306, 515

[56] References Cited

U.S. PATENT DOCUMENTS

| | | | |
|---|---|---|---|
| 1,152,789 | 9/1915 | Clemens | 425/126 R |
| 1,579,407 | 4/1926 | Smith | 425/126 R |
| 1,763,083 | 6/1930 | Bausman | 99/450.7 |
| 1,763,084 | 6/1930 | Bausman | 425/126 R |
| 1,786,108 | 12/1930 | Drury | 425/126 R |
| 1,963,036 | 6/1934 | Trolley | 198/693 X |
| 3,288,089 | 11/1966 | Schott | 425/126 R |
| 4,287,044 | 6/1980 | Lionello | 425/126 R |

Primary Examiner—Charles Hart
Attorney, Agent, or Firm—Kurt Kelman

[57] ABSTRACT

An apparatus is disclosed for placing wafer pieces into molding depressions of casting molds. The casting molds are continuously conveyed by a conveyor in a direction of travel. The wafer pieces are delivered with upwardly facing top faces to a support plate or a separating device which is spaced above the plane of conveyance for the casting molds and are moved on said support plate or through said separating device in a direction which is opposite to the direction of travel of the molds. A transfer device is provided between the conveyor, on the one hand, and the support plate or the separating device, on the other hand, and is provided with retaining elements for retaining the wafer pieces operable to gradually reverse the wafer pieces until they move upside down in the direction of travel of the casting molds in synchronism therewith and in register with respective ones of said molding recesses. By means of the separating device or the transfer device, the wafer pieces are laterally separated and by means of the transfer device are longitudinally separated until they have the same lateral and longitudinal spacing as said molding depressions.

42 Claims, 30 Drawing Figures

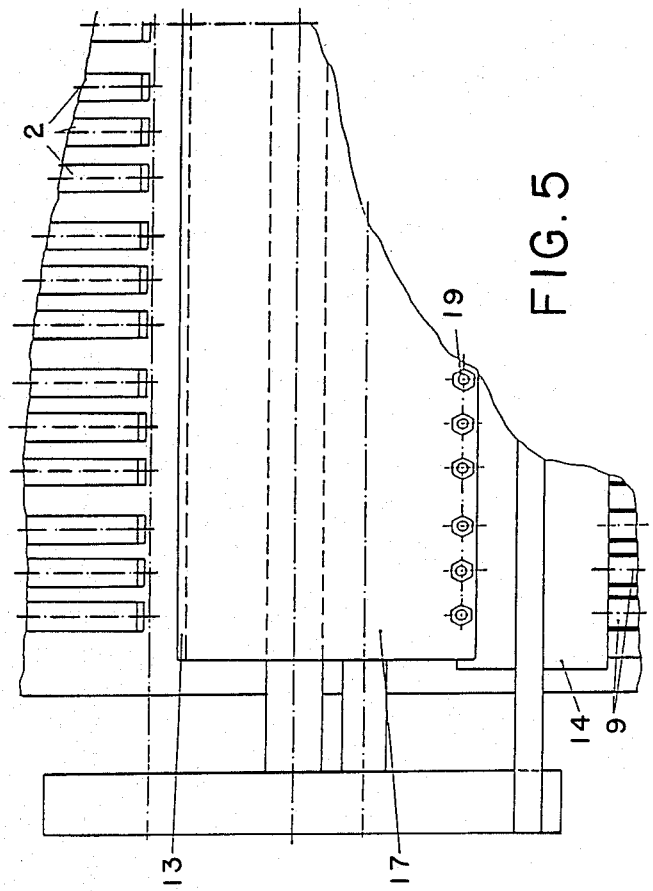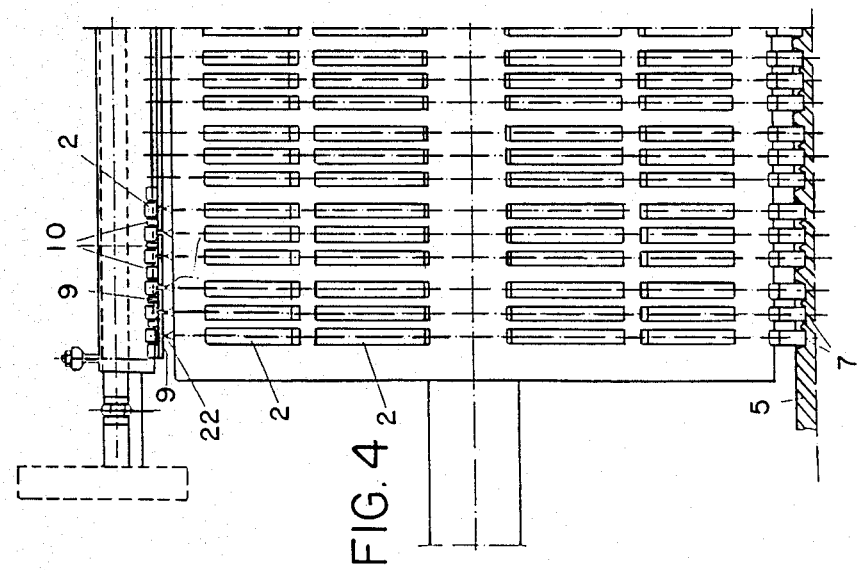

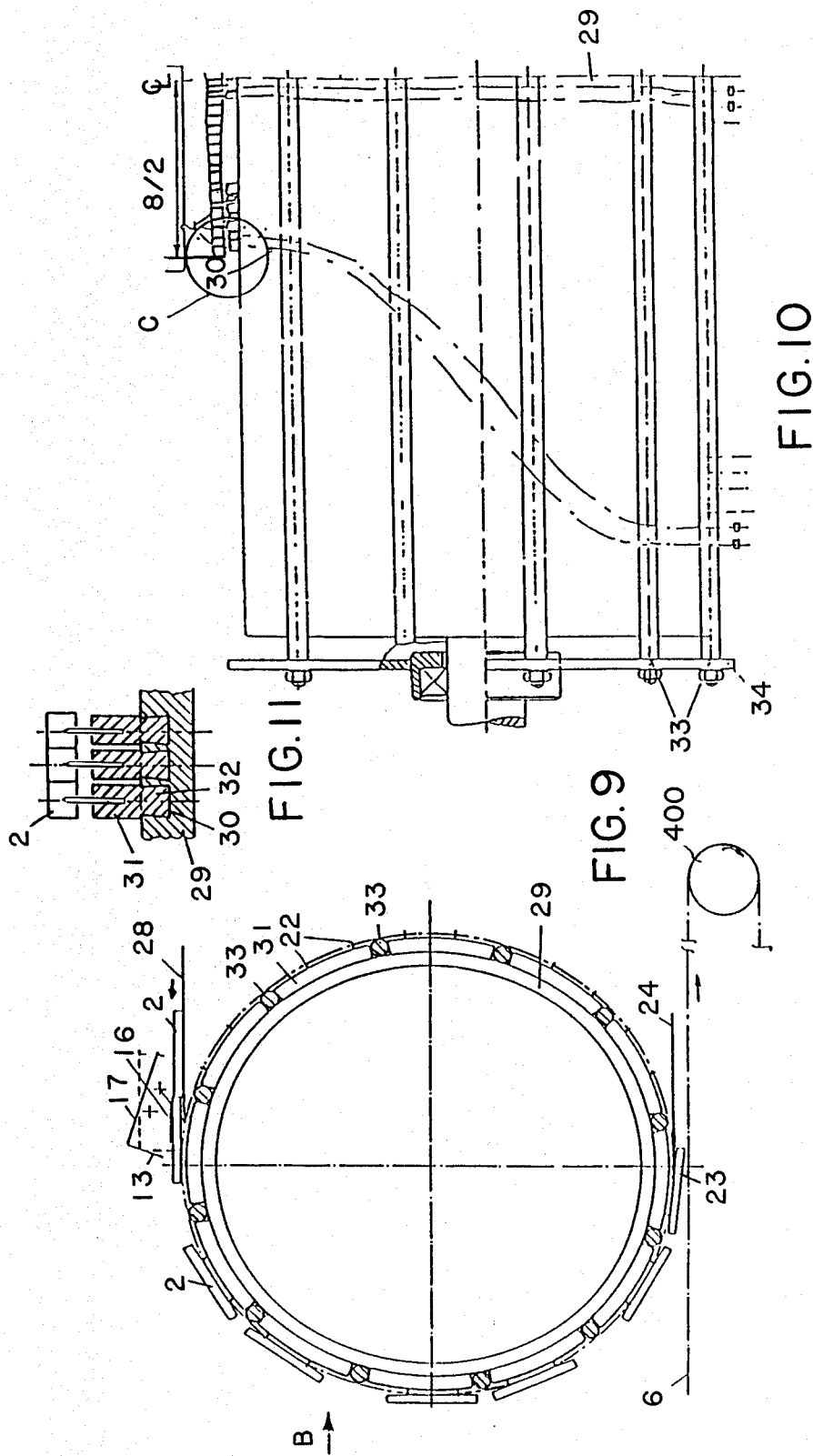

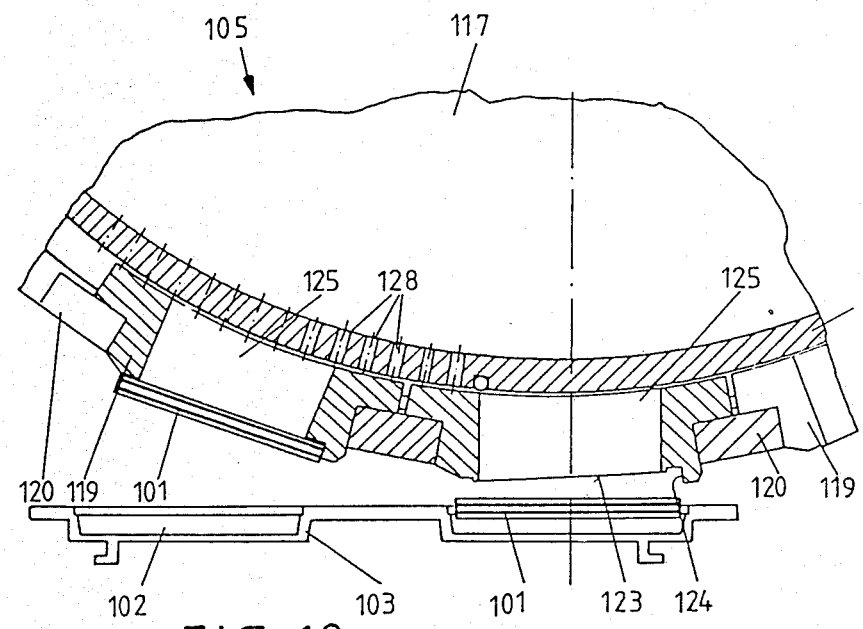
FIG. 18
FIG. 19
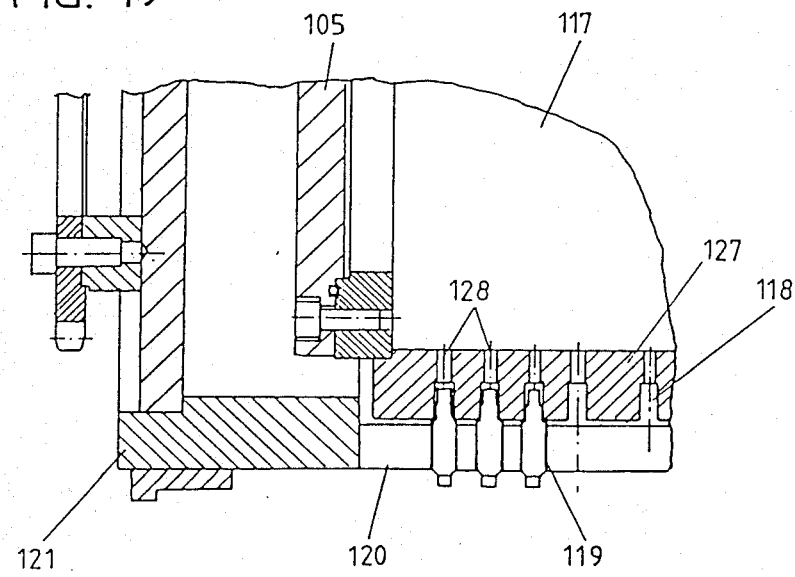

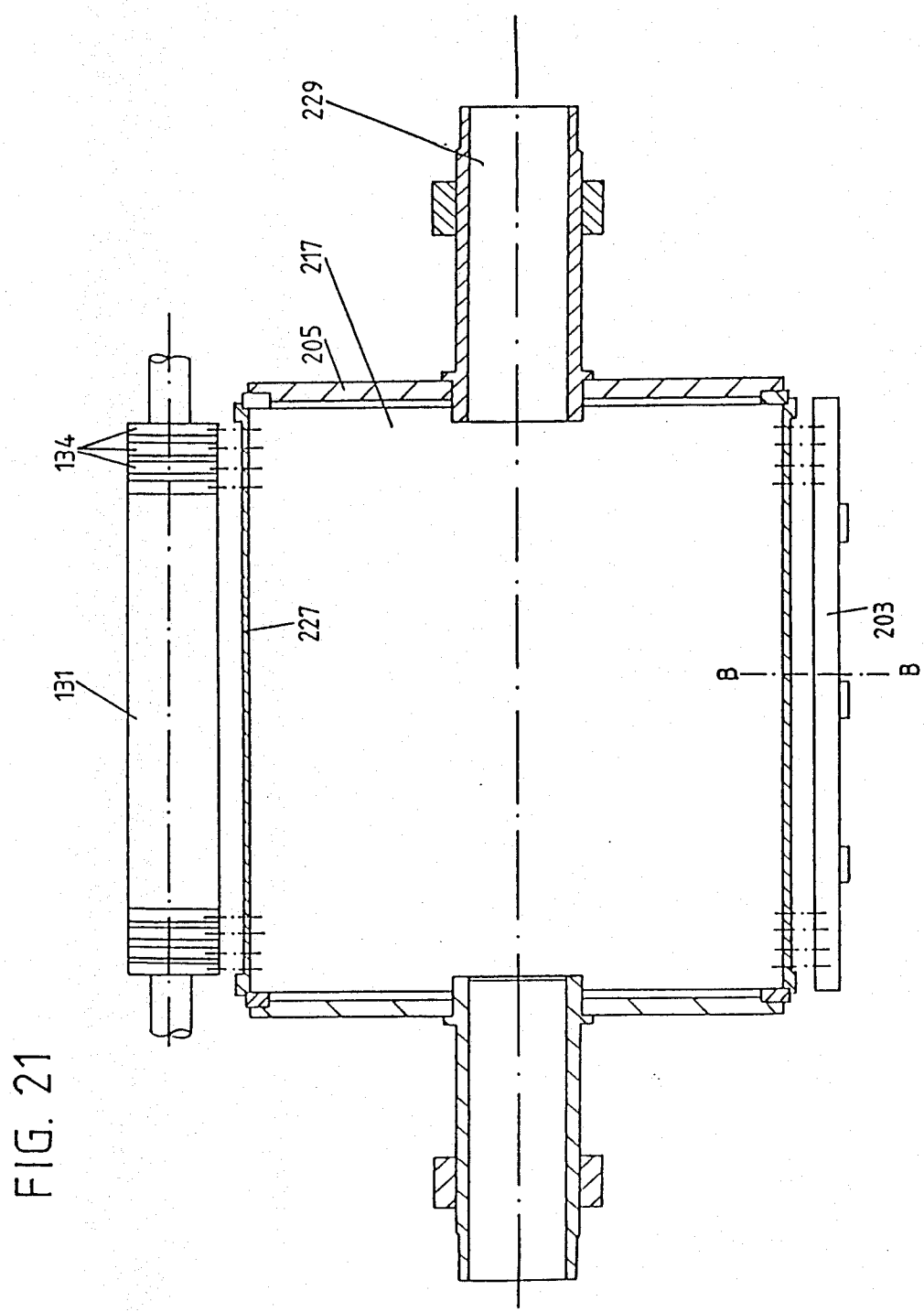

APPARATUS FOR PLACING CONFECTIONERY WAFER PIECES INTO MOLDING DEPRESSIONS OF CASTING MOLDS

CROSS-REFERENCES TO RELATED APPLICATIONS

This is a continuation-in-part of our copending application Ser. No. 315,285 filed Oct. 27, 1981 and now abandoned.

FIELD OF THE INVENTION

This invention relates to apparatus for placing wafer pieces into molding depressions of casting molds, such as molds used to cast chocolate slabs or bars, which have ribs, in which wafer pieces are embedded. Such chocolate slabs or bars consist each of a plurality of ribs, in which respective wafer pieces are embedded and which are interconnected by narrow bridges of chocolate to form a slab or bar.

DESCRIPTION OF THE PIOR ART

It is known that cherries, almonds, hazelnuts and similar items which will withstand rough handling can be embedded in cast slabs or bars of chocolate. In the piror art, the exact orientation of said embedded items is left to chance because the shape of the chocolate slab or bar will not depend on said orientation. For this reason the operation of the known apparatus for placing such items into molding depressions of casting molds involves a rather rough handling of the items to be embedded and does not control the orientation of the embedded articles.

It is also known that multiple wafer pieces of the kind known in Austria as "Neopolitaner-Schnitten" can be embedded in chocolate slabs or bars as they are cast in molds in plants for casting solid chocolate slabs or bars.

In such a plant, casting are consecutively moved on a conveyor to a pouring station, in which liquefied chocolate is poured into the casting molds and permitted to solidify therein. The casting molds have molding depressions and multiply wafer pieces fitting said depressions are placed into the latter. Each of such multiply wafer pieces has the shape of a narrow, elongate parallelepiped and consists of a plurality of superimposed wafer plies and interposed cream layers. The parallelepipedic wafer pieces are obtained by a cutting of wafer blocks, which consist of superimposed wafer sheets and of cream layers between the wafer sheets. The wafer sheets are baked products made from wafer dough and are of crisp, brittle, fragile consistency. For this reason the wafer pieces must be most gently handled if damage to the edges of the wafer sheet layers is to be avoided.

It is known that the wafer pieces can be made and can be inserted into the molding depressions of casting molds in a process in which wafer blocks are provided, which have a length that is equal to the length of a wafer piece and a width that is a multiple of the width of a wafer piece. Further in that process, each wafer block is cut into individual wafer pieces, which are then intermittently placed into the casting molds. In the known process, each wafer block is delivered to a chute, which is downwardly inclined and leads toward the pouring station, and is pushed on said chute through a cutter, which serves wafer pieces from the wafer block. The resulting wafer pieces are moved apart on that chute in diverging channels until they have the same lateral spacing as the molding depressions of the casting molds. At the delivery end of the chute, the wafer pieces are permitted to drop into the molding depressions. It is also known that a downwardly inclined chute having diverging channels may be replaced by a chute and a transfer device, which is reciprocable on the chute and consists of elements which can be pulled apart and pushed together like folds of an accordion. It is also known that the wafer blocks can be forced onto a square rotary cutter body, which carries parallel cutter blades, which will penetrate through the wafer block, and the resulting wafer pieces are frictionally retained between the cutter blades and are ejected above the casting molds into their molding depressions. The cutter body is axially displaced to align the wafer pieces with the molding depressions.

Said known apparatus have the disadvantage that the feeding of the wafer blocks to the cutters and the placing of the wafer pieces cut from the wafer block into the casting molds are intermittent operations so that the output capacity of the plant is highly restricted. Besides, the known processes permit only a processing of wafer blocks which have exactly the same length as a wafer piece.

It is also known that wafer pieces or wafer slices of the kind known in Austria as Neapolitaner-Schnitten can be obtained by successively cutting rectangular wafer blocks in two directions which are at right angles to each other. The wafer blocks used for that purpose have a length and width which are, respectively, a multiple of the length and width of each wafer piece, plus the inevitable oversize which can be removed by trimming the edges. In so-called wafer block cutters, such wafer blocks are cut in two directions which are at right angles to each other so that the resulting multiply wafer pieces emerging from the cutter will be arranged in transverse rows of abutting wafer pieces and in longitudinal rows of wafer pieces separated only by the cuts effected by the cutting wires or cutter blades of the wafer block cutter.

OBJECT OF THE INVENTION

It is an object of the invention to provide an apparatus of high output capacity for the placing of wafer pieces into molding depressions of casting molds.

It is another object of the invention to provide such an apparatus by which wafer pieces which have emerged from a wafer block cutter can be continuously placed into the casting molds and in which the wafer pieces are gently handled.

A further object of the invention is to provide such an apparatus by which the wafer pieces can be placed into the casting molds with high accuracy and in exact alignment with the respective molding depressions.

SUMMARY OF THE INVENTION

The above-mentioned and other objects are accomplished by an apparatus for placing wafer pieces into molding depressions of casting molds, each of said wafer pieces having top and bottom faces and being placed upside down into one of said molding depressions, which apparatus comprises:

Mold-conveying means for continuously conveying the casting molds in a plane of conveyance in a direction of travel in such a manner that the molding depressions of the casting molds are arranged to form a plurality of longitudinal rows extending in the direction of travel and having a predetermined lateral spacing and a plurality of transverse rows extending transversely to said direction of travel and having a predetermined longitudinal spacing, a separating device, which is spaced above the plane of conveyance and in which end-to-end abutting wafer pieces with upwardly facing top faces are moved opposite to the direction of travel of the casting molds and during said movement are laterally moved apart to have the same lateral spacing as the longitudinal rows of the molding depressions, and a transfer device, which is connected to the separating device and operable to receive the wafer pieces from the separating device, to move the wafer pieces apart opposite to the direction of travel of the casting molds until the wafer pieces have the same longitudinal spacing as the transverse rows of molding depressions, to gradually reverse and invert the wafer pieces so that the wafer pieces are moved upside down in the direction of travel of the casting molds and in synchronism with the casting molds and in register with respective molding depressions, and to gently place the wafer pieces into the molding depressions with which the wafer pieces are in register.

According to one feature of the invention, it is proposed that the transfer device comprises:

A support plate as a continuation of the separating device, arresting means for cooperating with the support plate to temporarily arrest the wafer pieces on the support plate, and a drum-shaped wafer piece carrier, which is operable to revolve on one side from the support plate to the mold-conveying means and on the other side from said mold-conveying means to the support plate about an axis which is parallel to said plane of conveyance and at right angles to said direction of travel, which wafer piece carrier is provided with retaining elements, which are disposed on the outside of the wafer piece carrier and adapted to register with respective molding depressions, each of said retaining elements being adapted to retain only one wafer piece at a time.

The retaining elements of the wafer piece carrier are arranged to retain the wafer pieces in a pattern in which they can properly be placed into the molding depressions of the casting molds.

In another aspect of the invention, the wafer piece carrier consists of a rotating drum, which has an upper apex adjacent to the support plate and a lower apex adjacent to the mold-conveying means, and the retaining elements consist of prongs, which are secured to the drum at its periphery and adapted to penetrate into the wafer pieces.

In an alternative arrangement, the wafer piece carrier consists of a rotating vacuum drum having an upper apex adjacent to the support plate and a lower apex adjacent to and closely spaced above the mold-conveying means, at least part of the interior of the drum communicates with a vacuum source, each retaining element defines on the outside peripheral surface of the vacuum drum a flat wafer piece bearing surface, which is succeeded in the direction of rotation of the drum by a stop for engagement by the leading end face of a wafer piece in contact with the wafer piece bearing surface, each wafer piece bearing surface is formed with a vacuum orifice for sucking a wafer piece against the wafer piece bearing surface, and said vacuum orifices communicate through respective vacuum ports in the drum with that at least part of the interior of the drum which communicates with the vacuum source.

When in that arrangement the vacuum drum is in a proper position, the wafer pieces are pushed from the support plate onto and along respective wafer piece bearing surfaces against the stops so that each wafer piece is in a defined position relative to the associated wafer piece bearing surface and is retained on said surface by the action of the vacuum and is subsequently placed into one of the molding depressions at the lower apex of the vacuum drum because the vacuum is eliminated from the associated vacuum orifice at that lower apex.

In another aspect of the invention, the wafer piece carrier has an upper apex adjacent to the support plate and a lower apex adjacent to the mold-conveying means and comprises a stationary drum and a concentric movable drum, the stationary drum is provided on the outside with tracks having at said lower apex a center spacing which is equal to the lateral spacing of the molding depressions of the casting molds, the movable drum comprises a plurality of peripherally spaced apart bars, which are parallel to the axis of the drum, a plurality of wafer piece carrying elements are provided, which are disposed between said bars have a peripheral spacing that is equal to the longitudinal spacing of the molding depressions of the casting molds, and said wafer piece-carrying elements are guided in the tracks of the stationary drum.

As soon as the wafer pieces have been retained by the retaining elements of the wafer piece carrier, the wafer pieces are in the proper relationship for being placed into the molding depressions of the casting molds.

In another aspect of the invention, the apparatus comprises:

Mold-conveying means for continuously conveying the casting molds in a plane of conveyance in a direction of travel in such a manner that the molding depressions of the casting molds are arranged to form a plurality of longitudinal rows extending in the direction of travel and having a predetermined lateral spacing and a plurality of transverse rows extending transversely to said direction of travel and having a predetermined longitudinal spacing, a feeder, which is spaced above the plane of conveyance and operable to convey the wafer pieces with upwardly facing top faces opposite to the direction of travel of the casting molds with the wafer pieces arranged in closely spaced apart longitudinal rows and in transverse rows of abutting wafer pieces, and a transfer device, which is connected to and receives the wafer pieces from the feeder and is operable to move the wafer pieces of consecutive transverse rows apart in the direction which is opposite to the direction of travel of the casting molds until the wafer pieces have the same longitudinal spacing as the molding depressions of the casting molds, to subsequently move the wafer pieces of each transverse row laterally apart until they have the same lateral spacing as the longitudinal rows of the molding depressions, to gradually reverse and invert the wafer pieces so that the wafer pieces are moved upside down in synchronism with the casting molds and in register with respective molding depressions thereof, and to gently place the wafer pieces into the molding depressions with which said wafer pieces are in register.

With that design, the wafer pieces, which may adjoin each other as they emerge from a wafer block cutter, may be placed in proper position into the molds for casting chocolate slabs or bars even when a laterally acting device for pulling the wafer pieces apart is not provided.

According to another feature of this invention, the transfer device comprises:

A support plate as a continuation of the separating device, arresting means for cooperating with the support plate to temporarily arrest the wafer pieces on the support plate, and a drum-shaped wafer piece carrier, which has an axis that is parallel to the plane of conveyance and at right angles to the direction of travel of the casting molds and has an upper apex adjacent to the support plate and a lower apex adjacent to the mold-conveying means, said wafer piece carrier consisting of a stationary drum and a movable drum which is concentric to said stationary drum, said stationary drum being provided on their outside with tracks, which diverge from the upper apex to the lower apex and have at the lower apex the same lateral spacing as the molding depressions of the casting molds, the movable drum comprises bars, and wafer piece carrying elements being provided, which are disposed between said bars and have a peripheral spacing that equals the longitudinal spacing of the molding depressions of the casting molds and are guided in the tracks of the stationary drum and provided with retaining elements.

The stationary drum may consist of a vacuum drum, at least part of the interior of the drum is connected to a vacuum source, at least in that portion which extends from the upper apex to the lower apex of the drum the tracks are provided with vacuum ports extending through the shell of the vacuum drum, and the wafer piece carrying elements are formed with vacuum passages, which communicate with said vacuum ports and on the outside open in respective wafer piece bearing surfaces, which in the direction of movement of the wafer pieces on said wafer piece carrying elements are succeeded each by a stop for engagement by the end face of a wafer piece.

When in that arrangement the vacuum drum is in a proper position, the wafer pieces are pushed from the support plate onto and along respective wafer piece bearing surfaces against the stops so that each wafer piece is in a defined position relative to the associated wafer piece bearing surface and is retained on said surface by the action of the vacuum and is subsequently placed into one of the molding depressions at the lower apex of the vacuum drum because the vacuum is eliminated from the associated vacuum orifice at that lower apex.

According to a further feature of the invention, a slider is provided, which is disposed in the vacuum drum adjacent to its lower apex and which covers the vacuum ports on the inside surface of the shell of the drum.

In accordance with the invention, the action of the vacuum to retain the wafer pieces on the wafer piece bearing surfaces may be assisted by a preferably driven pressure-applying roll, which cooperates with the wafer piece bearing surfaces. The pressure-applying roll can be moved away from the wafer piece bearing surfaces so that the wafer pieces will not be damaged as they move under the pressure-applying roll.

The pressure-applying roll disposed adjacent to the upper apex of the drum may also be used to assist the pushing of the wafer pieces against the stops in that the pressure-applying roll is driven to rotate at a surface speed exceeding the speed at which the wafer pieces are advanced on the support plate.

According to a further feature of the invention, a partition is provided in the interior of the drum and is rotatable about the axis of the drum and adapted to adjust that portion of the periphery of the drum in which the vacuum ports of the drum are shut off from the vacuum source.

With that arrangement, the action of the vacuum can be restricted to that region of the periphery of the vacuum drum which is occupied by wafer pieces during the beginning of the operation of the apparatus so that the wafer pieces will reliably be retained without a need for an increase of the vacuum in consideration of those vacuum ports which are not yet covered.

Further features, advantages and details of the apparatus for placing wafer pieces into the molding depressions of casting molds will become apparent from the following description of preferred illustrative embodiments, which are shown on the accompanying drawings.

BRIEF DESCRIPTION OF THE DRAWING

FIG. 4 is an elevation showing the embodiment of FIG. 3 viewed in the direction of the arrow A in FIG. 3.

FIG. 5 is a fragmentary top plan view showing a detail of FIG. 3.

FIG. 9 is a side elevation showing another embodiment of apparatus which embodies the invention and in which the wafer piece carrier consists of a stationary drum and a rotatable drum which is concentric thereto.

FIG. 10 is a diagrammatic elevation showing one half of the embodiment of FIG. 9, viewed in the direction of the arrow B in FIG. 9.

FIG. 11 is a fragmentary sectional view showing the detail designated C in FIG. 10.

FIG. 18 is an enlarged sectional view taken on line A—A in FIG. 17.

FIG. 19 is an enlarged sectional view taken on line IV—IV in FIG. 16.

FIG. 21 is a sectional view taken on a plane which contains the axis of the drum and shows a further embodiment of the invention wherein the wafer piece carrier consists of a rotating drum.

DETAILED DESCRIPTION OF THE PREFERRED EMBODIMENTS

The apparatus in accordance with the invention serves to place wafer pieces into the rib-molding depressions of slab-casting molds. In said rib-molding depressions the wafer pieces are embedded in an edible molding compound, such as chocolate, which is poured into the casting mold in a liquid state. The rib-molding depressions are arranged in each slab-casting mold in spaced apart longitudinal and transverse rows in a pattern which corresponds to the rib pattern of a slab or bar of chocolate.

Figure 1:
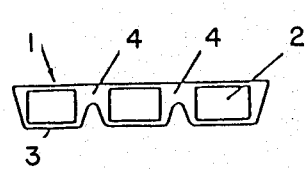
FIG. 1 is a transverse sectional view showing a slab of chocolate comprising wafer-filled ribs.
Figure 2:
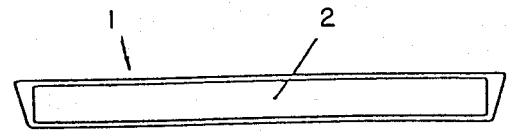
FIG. 2 is a longitudinal sectional view showing the slab of chocolate of FIG. 1.

FIGS. 1 and 2 show a slab or bar of chocolate 1 containing ribs 3 filled with pieces of wafer 2 and interconnected by means of chocolate bridges 4.

Chocolate slabs or bars of this type are produced in molding plants for solid chocolate.

Such slabs 1 of chocolate are made in a slab-casting plant, in which molds 5 for casting slabs of chocolate are conveyed on a conveyor 6.

The casting molds 5 are formed with molding depressions 7 for molding the ribs 3 of the slab 1 of chocolate. The molding surfaces of the casting molds 5 are initially coated with a layer of chocolate, whereupon the wafer pieces 2 are placed into the molding depressions 7 of the molds 5 and then the remaining space in the molds 5 is filled with chocolate.

The wafer pieces 2 are formed by cutting wafer sheets or wafer blocks in a wafer block cutter. In order to place the wafer pieces 2 into the molding depressions 7 of the molds so that, when the molds are filled with chocolate, none of the wafer pieces will protrude from its chocolate cover, it is necessary to accurately align each wafer piece 2 with the molding depression into which the wafer is to be placed. In this regard, the wafer pieces emerge from the wafer block cutter in such an arrangement that the wafer pieces adjoin each other both in the lateral and longitudinal directions or are laterally spaced apart only by the width of the cuts effected by the cutting device. As the wafer pieces 2 emerge from the wafer block cutter, they are moved opposite to the direction of travel of the casting molds 5 and they are then laterally and longitudinally separated to have the same lateral and longitudinal spacing as the molding depressions 7. The wafer pieces 2 are subsequently reversed and inverted so that they move in synchronism with the casting molds 5 and are then permitted to fall into the molding depressions 7 of said molds.

Figure 3:
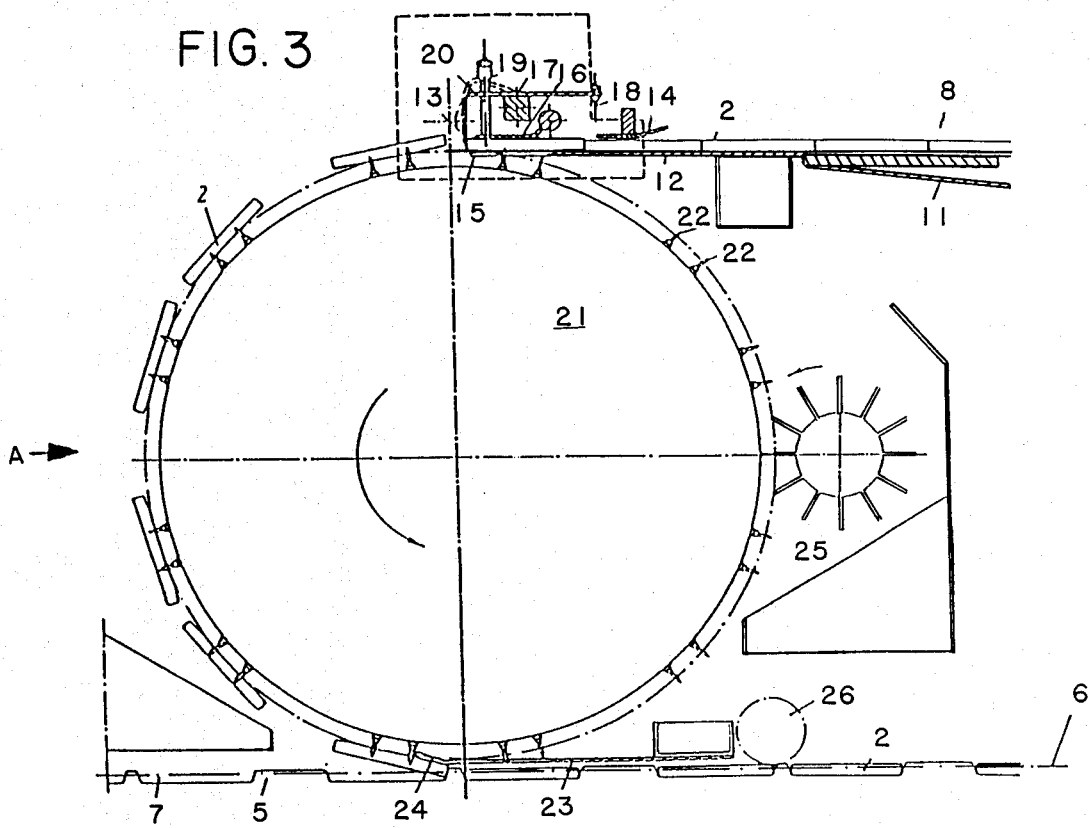
FIG. 3 is a transverse sectional view showing a first embodiment of apparatus which embodies the invention and in which the wafer piece carrier consists of a rotating drum provided with fixed prongs for retaining the wafer pieces.

The embodiment shown in FIG. 3 comprises a separating device 8, which has diverging channels 9 for guiding adjacent wafer pieces. The channels 9 are defined by the lateral guides 10 and by a bottom. At the delivery end of the separating device, a conveyor 11 is provided, which constitutes a continuation of the bottoms of the channels. The juxtaposed wafer pieces are moved apart by diverging channels 9 to have the same lateral spacing as the molding depressions when the wafer pieces enter a succeeding transfer device.

The transfer device comprises a support plate 12, which constitutes a continuation of the conveyor belt 11 of the separating device 8. conveyor belt 11 pushes the wafer pieces 2 onto the support plate 12 against a stop 13. A hold-down device 14 for holding down the wafer pieces is disposed over the support plate 12 in a fixed relation thereto and is spaced above the support plate 12 slightly in excess of the height of the wafer pieces.

The end of the support plate 12 remote from the separating device 8 is formed like a comb with a plurality of slots 15. Above the comb-like end of the support plate 12, a hinged pressure-applying plate 16 is arranged, which is capable of rotating between a position wherein it is parallel to the support plate 12 and a position inclined to the support plate 12.

A two-arm lever 17 is disposed over the pressure-applying plate 16 and is pivoted on an axis which is transverse to the direction in which the wafer pieces are advanced on the support plate. The lever 17 is angled downward at its downstream end facing in the direction of travel of the wafer pieces, and is equipped with a stop 13 for the wafer pieces 2. At the other end the lever 17 is provided with prongs 18 in one or more rows extending transversely to the direction of travel of the wafer pieces. The prongs of each row register with respective wafer pieces of a transverse row thereof on the support plate 12. The distance of the first row of prongs 18 from the stop 13 is larger than the length of a wafer piece and dimensioned so that upon the pivoting of the lever 17 the prongs 18 of the foremost row thereof will penetrate into respective wafer pieces 2 of that transverse row thereof which immediately succeeds the wafer pieces 2 of that transverse row which are just being released by the stop 13. The prongs 18 of that row are intended to ensure that the wafer pieces which are advanced by the conveyor belt 11 will not move beyond the stop 13 when it is still raised. That stop 13 must not be lowered until the wafer pieces have been retained on the drum and the trailing end of said wafer pieces have been advanced beyond the path of the stop 13. This row of prongs has the function to insure that the wafer pieces urged by the transport means 11 do not travel past the stop 13 still in the open position, as the stop 13 may be lowered only when the trailing end of the wafer piece secured to the drum 21 has passed out of the path of the stop. If several rows of prongs 18 are provided, successive prongs 18 may penetrate either one wafer piece or two successive wafer pieces.

The hinged pressure-applying plate 16 is connected by means of lateral rams 20, equipped with stops 19, to the two-arm lever 17 so that, upon pivoting of the lever 17 and lifting of the stop 13 a predetermined distance, the pressure-applying plate 16 is also pivoted.

Underneath the support plate 12 and above the conveyor 6 for the molds 5, a wafer piece carrier 21 is arranged. The latter consists of a drum and is driven by the drive means 400 (see FIG. 9) for the conveyor 6 for the molds 5. The drum is provided on its periphery with retaining elements in the form of prongs 22 for retaining the wafer pieces 2. In the exemplary embodiment, two prongs 22 are associated with each wafer piece 2 and each molding depression 7 of the casting molds 5. For that purpose, the peripheral center spacing of two peripherally adjacent pairs of prongs 22 equals the center spacing of two molding depressions 7 which succeed each other in the direction of travel of the casting molds 5 and are intended to receive the wafer pieces that have been forced onto the prongs 22 of said two pairs. The lateral spacing of the prongs 22 in the axial direction of the drum equals the lateral center spacing of the molding depressions 7.

Upon the rotation of the drum 21, the prongs 22 pass through the slots 15 of the support plate 12.

Between the drum 21 and the top side of the molds 5, a raking device 23 having a guide plate is provided. The guide plate is arranged in a generally tangential position with respect to the drum 21.

The guide plate has a leading section 24, which is inclined toward the drum 21. Just as the support plate 12, the guide plate is formed with slots for the passage of the prongs 22.

A cleaning brush 25 is placed adjacent to the circumference of the drum 21 and cleans off wafer and cream residues.

The raking device, which is closely spaced above the top of the casting molds 5, may be succeeded by a roll 26, which rests on top of the molds 5 and is adapted to locally compress any protruding edge portions of the wafer pieces 2 below the edge of the casting molds.

Figure 6:
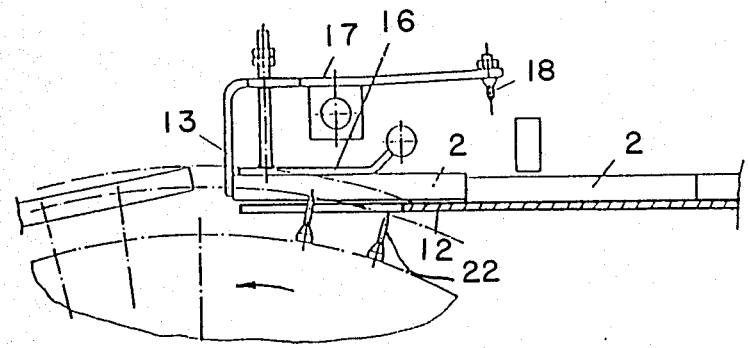
FIGS. 6 to 8 illustrate consecutive positions of a movable stop and a pivoted pressure-applying plate cooperating with the prongs of the wafer piece carrier.
Figure 7:
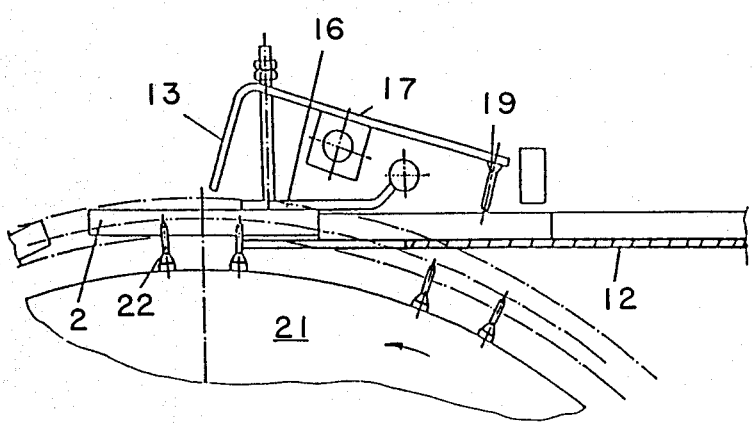
Figure 8:
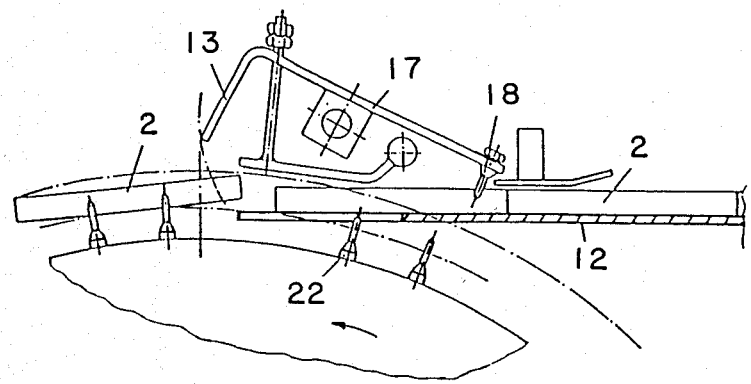
Figure 12:
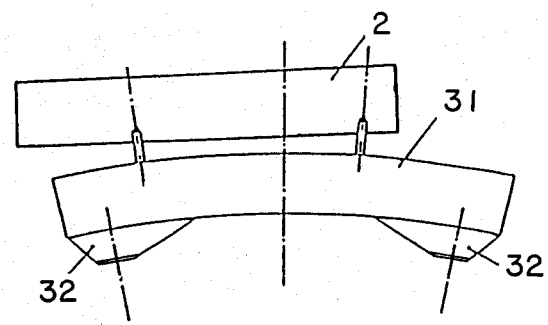
FIG. 12 is a side elevation showing an embodiment of a wafer piece carrying element.
Figure 13:
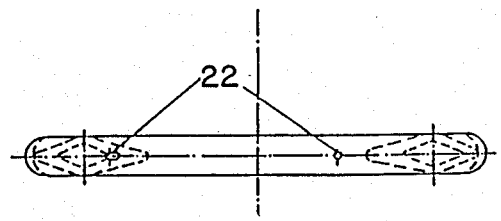
FIG. 13 is a top plan view showing the wafer piece carrying element of FIG. 12.

With reference to FIGS. 6 to 8, the cooperation of the two-armed lever 17, the hinged pressure-applying plate 16 and the drum 21 provided with the prongs 22 will now be explained more in detail. At the beginning of each cycle of operations, the stop 13 and the pressure-applying plate 16 are in a lower position and the conveyor belt 11 of the separating device 8 has pushed the wafer pieces 2, against the stop 13.

The leading row of the wafer pieces 2 which have been laterally separated by the separating device 8, extends along an arcuate line. The wafer pieces 2 of that leading row are then aligned by the stop 13 so that said row extends at right angles to the direction of travel of the casting molds 5 and parallel to the axis of the drum 21.

As the result of the rotation of the drum, the first prong 22 of a pair of prongs penetrates into each wafer piece positioned against the stop 13. The wafer piece 2 is then pressed against both the pressure-applying plate 16 and the stop 13 by the action of the drum 2 and the prongs 22. The distance of the first prong 22 from the leading edge of the wafer piece 2 is thereby set accurately. The stop 13 is then raised by the lever 17 and the first prong 22 entrains the wafer piece. During the continued rotation of the drum 21, the second prong 22 penetrates the wafer piece 2, which is thereupon advanced further. The two-arm lever 17 then pivots further, thereby raising the pressure-applying plate 16 by means of the rams 20 and the stops 19. This permits the trailing portion of the wafer piece 2 to pass freely under the pressure-applying plate 16. At the same time, the prong 18, fastened to the upstream end of the lever 17, will now penetrate into the next wafer piece 2.

As soon as the rear end portion of the wafer piece 2 has passed the front end of the pressure-applying plate 16, the two-arm lever 17 is partially swiveled back. This both lowers the pressure-applying plate 16 to its lower position and withdraws the prong 18 from the following wafer piece. After the trailing edge of the wafer piece 2 has passed through the path of motion of the stop 13, the stop returns to its initial position and the next piece of wafer is pushed by the conveyor belt 11 against the stop 13 and the sequence of movements is then repeated.

The sequence of operations has been explained hereinabove for one wafer piece 2 and for the wafer piece following it. Obviously, the same operating sequences are applicable to all of the wafer pieces arranged in a transverse row.

In FIGS. 9 and 10, a further embodiment of the invention is depicted. In this embodiment, a feeder 28 is positioned above the conveyor 6 for the molds 5. The wafer pieces 2 delivered by the feeder 28 abut in the longitudinal direction and are laterally spaced apart only by the width of the cuts effected by the wafer block cutter. Regarding the separating of the wafer pieces in the longitudinal direction until they have the same longitudinal spacing as the molding depressions 7, that embodiment agrees with the design described with reference to FIGS. 6 to 8. But the present embodiment differs from the one described above as regards the means for laterally separating the wafer pieces to the same lateral spacing as the molding depressions 7. In the present embodiment, a stationary drum 29 having a plurality of diverging tracks 30 on its circumference is provided. The tracks 30 have the configuration of dovetailed, T-shaped, or similar groves. The tracks extend over one-half of the circumference of the drum. At the upper apex of the drum 29, the tracks have the same center spacing as the wafer pieces 2 when they are separated only by the width of the cut effected by the wafer block cutter. At the lower apex of the drum 29, the tracks 30 have the same center spacing as the depressions 7 of the casting molds 5. Wafer piece carrying elements 31 have two bosses 32 extending into one of the tracks 30 and also carry retaining elements for retaining the wafer pieces 2 on the drum 29.

The retaining elements provided on each wafer piece carrying element preferably consist of two prongs 22, and the trailing boss 32 of each carrying element 31 is arranged to succeed a wafer piece 2 which has been impaled on the prongs 22 of the same carrying element 31.

The carrying elements 31 are arranged at the periphery of the drum 29 in rows, which are separated by rods or bars 33. The rods or bars 33 protrude laterally from the stationary drum 29 and are interconnected by laterally disposed discs 34, which are rotatably mounted on the stationary axle of the drum, to form a rotatable drum, which is adapted to be driven by the conveyor 6 for the casting molds. Rotation of the drum displaces, the carrying elements 31, row by row, along the tracks 30. The tracks 30 extend around the circumference of the stationary drum 29 in such a manner that the carrying elements 31 will be parallel to each other both while initially contacting the wafer pieces 2 and while placing them into the molding depressions 7 of the molds 5.

Figure 14:
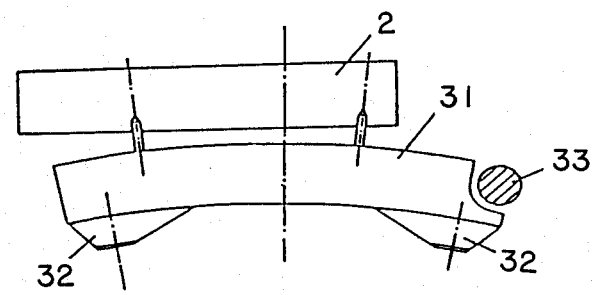
FIG. 14 is a side elevation which is similar to FIG. 12 and shows another embodiment of the wafer piece carrying element.
Figure 15:
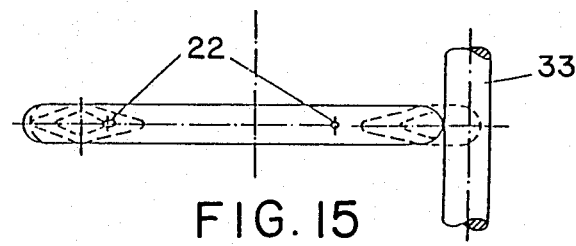
FIG. 15 is a top plan view showing the wafer piece carrying element of FIG. 14.
Figure 16:
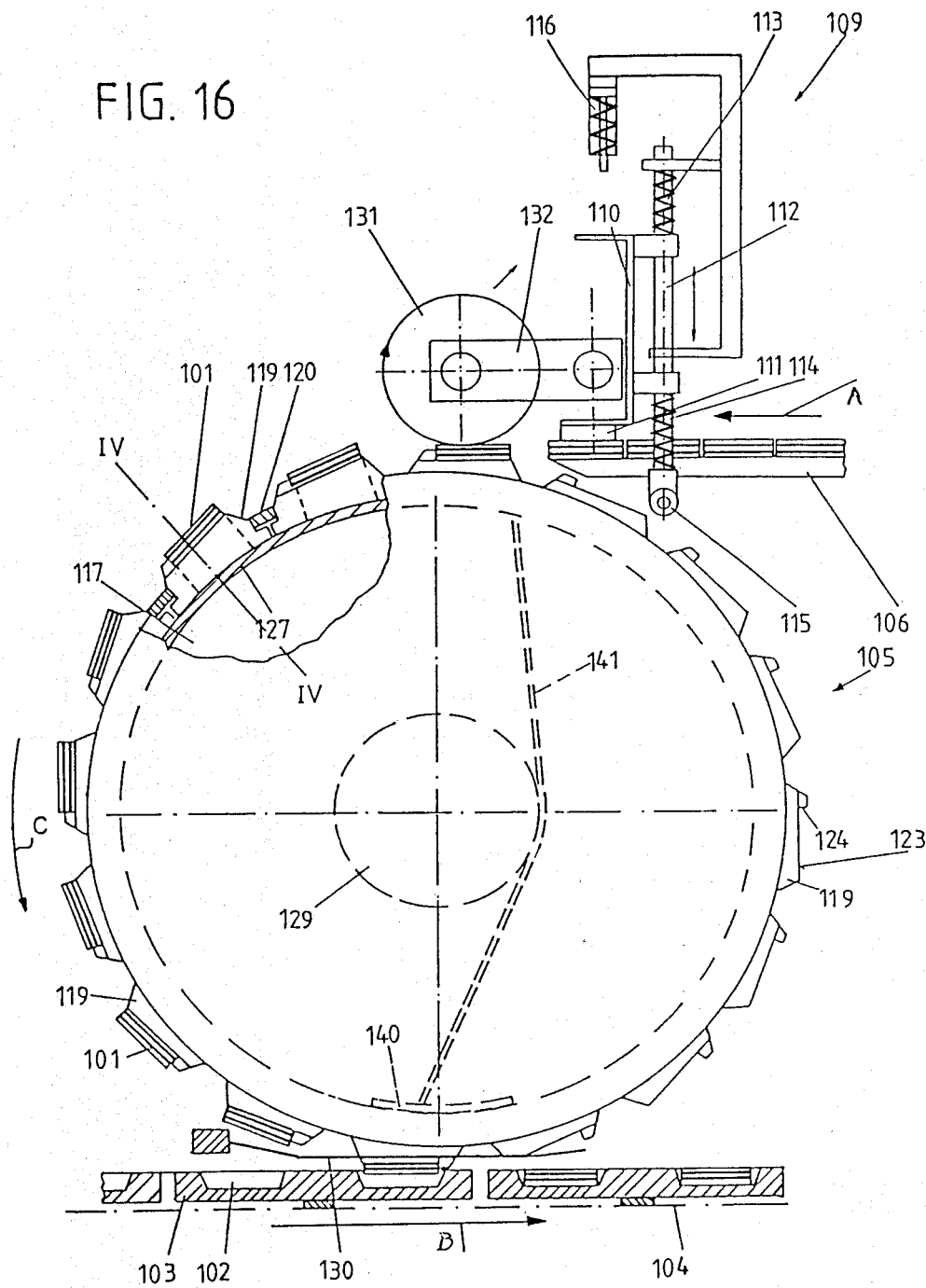
FIG. 16 is a diagrammatic side elevation showing a further embodiment of the apparatus embodying the invention, partly broken away, wherein the wafer piece carrier consists of a stationary drum and a rotatable drum which is concentric thereto.
Figure 17:
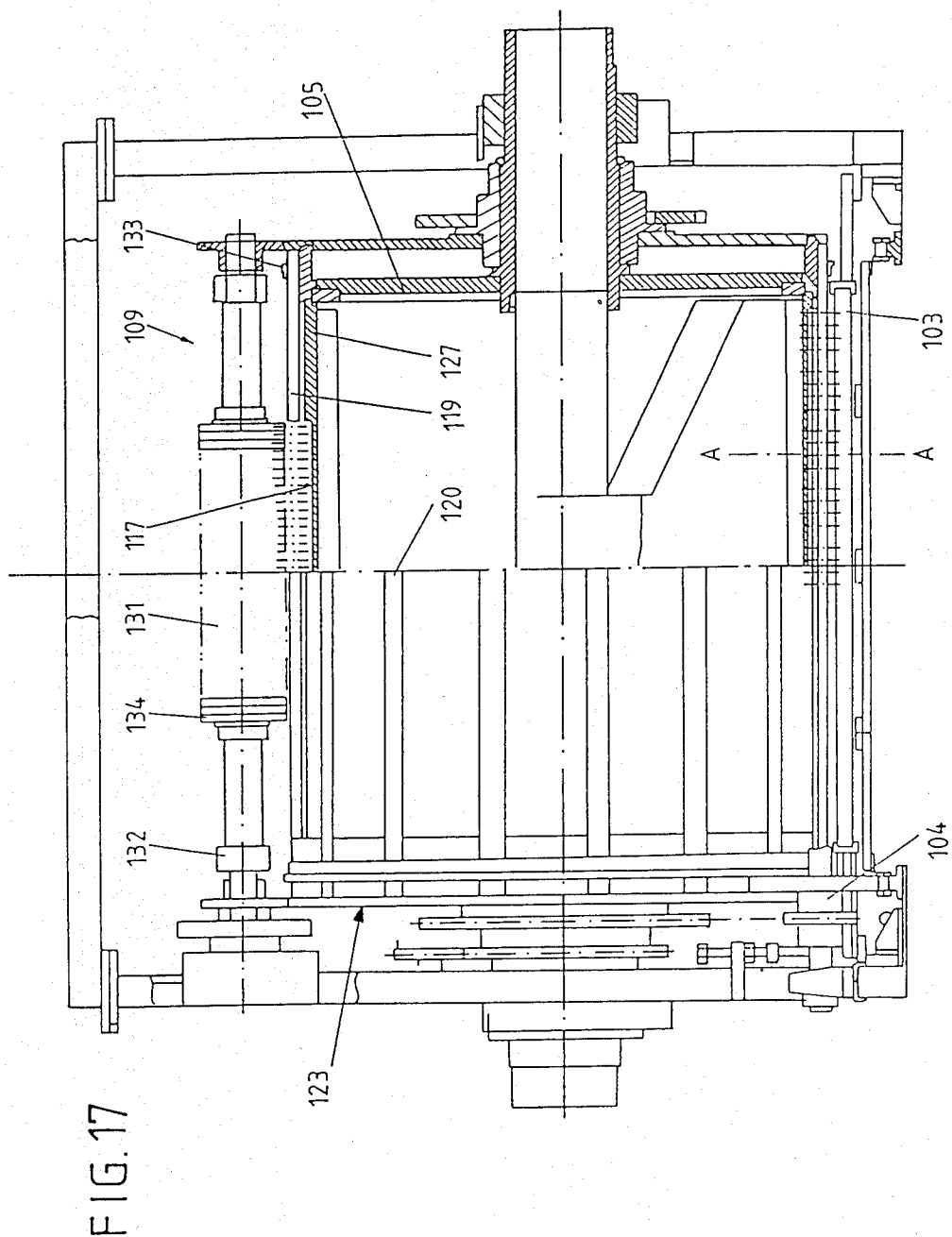
FIG. 17 is a front elevation showing the apparatus of FIG. 16, partly broken away.
Figure 20:
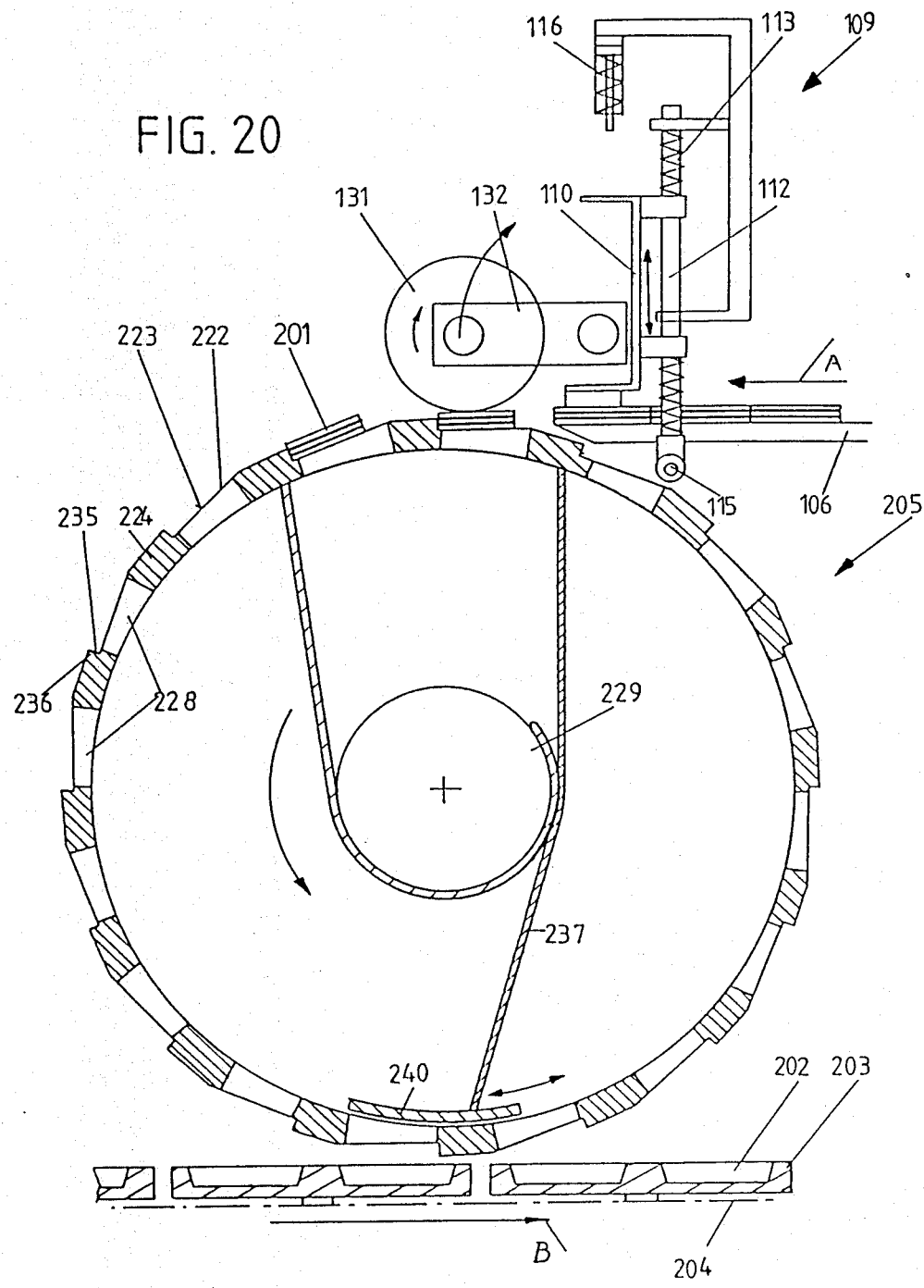
FIG. 20 is a sectional view taken on a line which is normal to the axis of the drum and shows a further embodiment of apparatus embodying the invention, wherein the wafer piece carrier consists of a rotating drum.

In a variation of the invention, a plurality of wafer piece carrying elements are provided, which on their bosses extending into the tracks are formed with projections which are positioned below the rods or bars 33 when the carrier element 31 has been set on the drum 29. In that case, the tracks 30 may take the configuration of simple grooves and the carrying elements 31 will be securely held in the tracks 30 since the rods or bars 33 overlap the projections of the carrying elements 31. For this purpose, the trailing end of the carrying element 31 is semicircular (FIGS. 14 and 15). It is apparent from FIG. 14 that the tracks 30 of the drum 29 form a pattern which is symmetrical to the center line of the path of travel of the casting molds and diverge substantially uniformly.

In the illustrative embodiments shown in FIGS. 16 to 19, the wafer piece carrier consists of a stationary drum and a rotatable drum, which is concentric thereto. In the illustrative embodiments shown in Figures 20 to 23, the wafer piece carrier consists of a rotating drum.

Figure 24A:
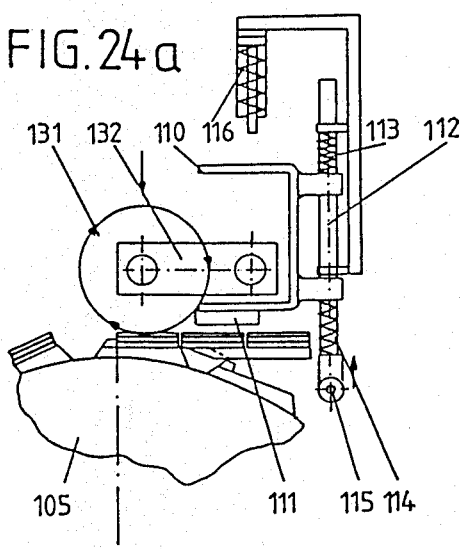
FIGS. 24a to 24d illustrate the parts disposed near the upper apex of the drum of FIG. 16 in consecutive positions.
Figure 24B:
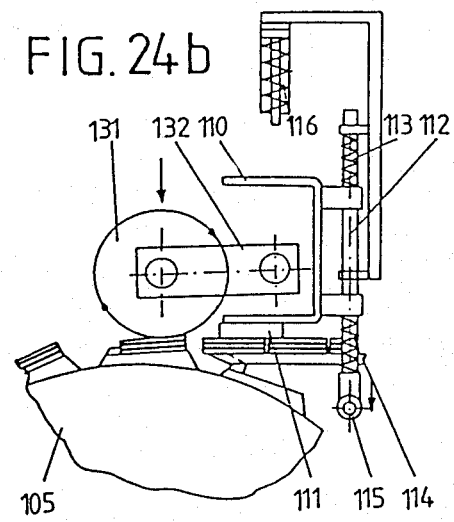
Figure 24C:
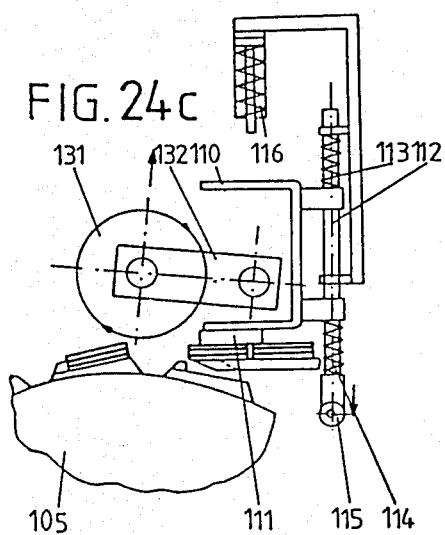
Figure 24D:
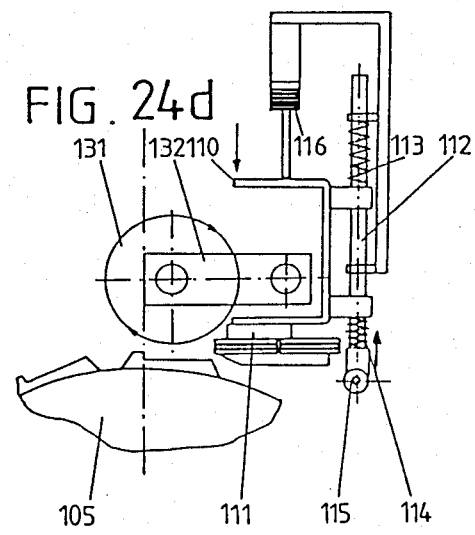
Figure 25:
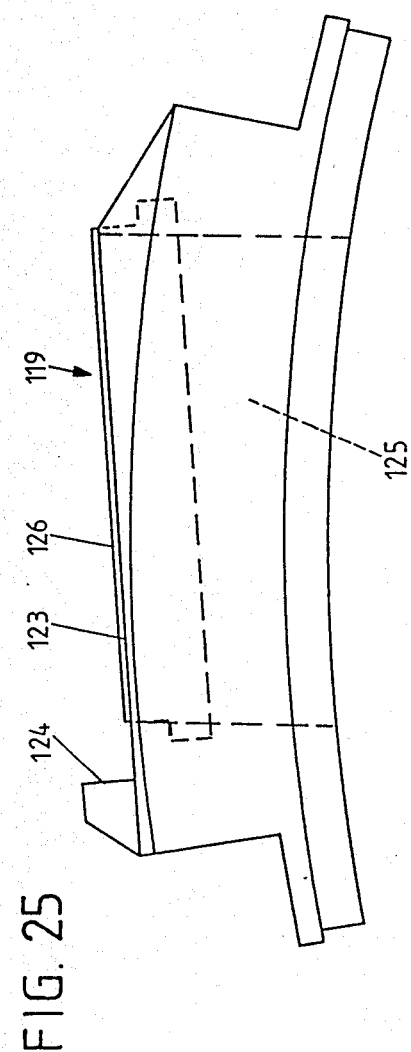
FIG. 25 is a side elevation showing a further embodiment of a wafer piece carrying element.

The casting molds 103 are conveyed on conveyor 104 along a straight line under the lower apex of a drum 105, the axis of which extends transversely to the direction of travel of the conveyor 104. On a support plate 106 disposed adjacent to the upper apex of the drum, the wafer pieces 101 arranged in consecutive transverse rows are fed to the drum 105 in a direction (arrow A) which is opposite to the direction of travel of the casting molds 103 (arrow B). An arresting device 109 for arresting the wafer pieces 101 is disposed above the support plate 106 and comprises a crossbeam 110, which is adapted to be raised and lowered relative to the support plate 106. An elastic bar 111 is secured to the underside of the crossbeam 110 and when the crossbeam 110 has been lowered rests on the top of the wafer pieces 101 and arrests the wafer pieces 101 on the support plate 106. The crossbeam 110 is mounted on a plurality of laterally spaced apart, vertical guide rods 112, which are vertically displaceable in suitable guides. The crossbeam 110 is held on each of said rods between two compression springs 113, 114, which tend to hold the crossbeam 110 in its lower position. Cam follower rollers 115 are mounted at the lower ends of the guide rods 112 and cooperate with cams (not shown), which revolve with the drum 105. As the guide rods 112 are raised by the cam follower rollers 115, the crossbeam 110 is raised too and the upper springs 112 are compressed (FIG. 24a). The arresting device 109 also comprises a pneumatic cylinder 116, which is disposed above the crossbeam 110 and is operable to engage the top of the crossbeam 110 and to depress the crossbeam 110 against the force of the lower springs 114 and with the aid of the force of the upper springs 113. In that case the lower springs 114 will be compressed and the crossbeam 110 will not be raised from the wafer pieces 101 when the guide rods 112 are raised by the cam follower rollers 115 so that the feeding of wafer pieces 101 to the drum 105 will then be discontinued (FIG. 24d).

In the embodiment of the transfer apparatus shown in FIGS. 16 to 19, the drum 105 consists of a stationary vacuum drum having an interior space 117 which communicates with a vacuum source, not shown. The drum 105 is formed in its periphery with track grooves 118 for guiguiding wafer piece carrying elements 119. The lateral spacing of the track grooves 118 at the upper apex of the drum equals the lateral spacing of the wafer pieces 101 lying on the support plate 106. The track grooves 118 diverge as they extend on the forward side of the drum 105 toward the lower apex of the drum so that their lateral spacing increases to a spacing which equals the lateral spacing of the rib-molding depressions 102 of the casting molds 103. On the rear side of the drum 105 the track grooves 118 converge to a lateral spacing which is equal to the lateral spacing of the wafer pieces 101 lying on the support plate 106. If the lateral spacing of the wafer pieces on the support plate 106 exceeds the lateral spacing of the depressions 102 of the casting molds, the track grooves converge on the front side of the drum and diverge on the rear side of the drum.

Figure 26:
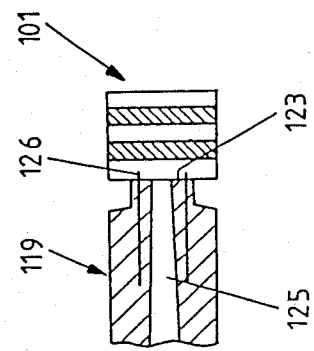
FIG. 26 is a sectional view showing the top portion of the wafer piece carrying element of FIG. 25.
Figure 27:
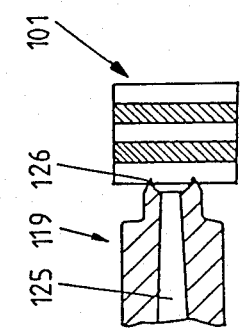
FIG. 27 is a sectional view that is similar to FIG. 26 and shows a further embodiment of the wafer piece carrying element.

The wafer piece carrying elements 119 extending in the track grooves 118 are arranged in transverse rows, each of which is disposed between bars or rods 120 of a movable drum 121, which is concentric to and revolves about the stationary drum 105. The peripheral spacing of said transverse rows of wafer piece carrying elements equals the longitudinal spacing of the rib-molding depressions 102 of the casting molds 103. The movable drum 121 is driven in synchronism with the conveyor 104. As the drum 121 revolves, it displaces the wafer piece carrying elements 119 along the track grooves 118. Each wafer piece carrying element 119 is formed on that side which protrudes from the associated track groove 118 with a wafer piece bearing surface 123, which is formed with a vacuum orifice 122. Adjacent to the wafer piece bearing surface 123 each wafer piece carrier element 119 is provided on its top with a stop 124 for engaging the leading end face of a wafer piece 101. Each wafer piece carrying element 119 is formed with a passage 125, which extends from the vacuum orifice 122 in the wafer piece bearing surface 123 and opens on the underside of the wafer piece carrying element 119. Each wafer piece carrying element 119 may be formed on its top on opposite sides of its vacuum orifice 122 with longitudinally extending knife edges 126, which protrude above the wafer piece bearing surface 123 to an extent which equals the depth of the engraving on the underside of the wafer piece 101. Said knife edges 126 may be constituted by knives, which protrude from the otherwise planar wafer piece bearing surface 123 and which are slightly spaced apart from the vacuum orifice 122 (FIG. 26). Alternatively, the knife edges 126 may laterally define the vacuum orifice 122 (FIG. 27).

In the forward portion of the stationary drum 105, which extends opposite to the direction of movement of the drum (arrow B) from the upper apex of the drum to the lower apex of the drum, the drum 105 is formed with vacuum ports 128, which extend through the shell 127 of the drum 105 and open at the bottom of each track groove 118 and on the inside of the drum 105. The vacuum ports 128 communicate with a vacuum source via a vacuum pipe 129, which axially extends through one end wall of the stationary drum 105.

When the wafer piece carrying elements 119 are moved by the revolving drum 121 along the forward portion of the drum 105, the passages 125 of the wafer piece carrying elements 119 communicate through the vacuum ports 128 with the vacuum pipe 129 so that the wafer pieces 101 lying on the wafer piece bearing surfaces 123 are retained on the latter by the vacuum. The wafer pieces 101 are released by the wafer piece carrying elements 119 only when they are disposed adjacent to the lower apex of the drum 105 over associated casting molds 103 because no vacuum ports 128 open into the track grooves 118 in that region so that the vacuum retaining the wafer pieces 101 is eliminated there. Adjacent to the lower apex of the drum 105 a rake 130 is disposed above the path of the casting molds 103 and is formed with slots for guiding the wafer pieces 101, which are moved through said slots before they drop into the rib-molding depressions 102 of the casting molds 103 because the vacuum has been eliminated. By said rake 130 the wafer pieces 101 still retained on the wafer piece carrying elements 119 are exactly aligned with the rib-molding depressions 102 of the casting molds 103 so that any wafer pieces which may have slightly been displaced on the wafer piece bearing surfaces 123 will be moved to the correct positions. A hold-down member consisting, e.g., of a roller, which is not shown, may be provided above the path of the casting molds 103 and may be used to force the wafer pieces 101 into the rib-molding depressions 102 of the casting molds 103.

A pressure-applying roll 131 is suitably provided adjacent to the upper apex of the drum 105 and may be driven by gears or the like. The pressure-applying roll 131 is rotatably mounted in pivoted arms 132, which are pivotally moved away from the periphery of the drum 105 by cams 133, which are carried by the drum 121. The pressure-applying roll 131 comprises elastic discs 134, which are associated with respective wafer pieces 101 of a transverse row thereof and each of which engages the associated wafer piece 101 as the latter is transferred to the associated wafer piece carrying element 119. As a result, the discs 134 urge the wafer pieces 101 of each transverse row against the wafer piece bearing surfaces 123 of the wafer piece carrying elements 119 of a transverse row. If the wafer piece carrying elements 119 are provided with knife edges 126 extending laterally of the associated vacuum orifice 122, the wafer pieces will be pushed onto the knife edges 126 so that the latter penetrate into the wafer piece 101 on its underside to the depth of the engraving of the wafer piece and the seal between the wafer piece 101 and the wafer piece bearing surface 123 is thus improved. The gears for driving the pressure-applying roll 131 may be so selected that said roll is driven at a surface speed which slightly exceeds the peripheral speed of the wafer piece carrying elements 119 so that the wafer pieces 101 will be pushed on the wafer piece bearing surfaces 123 against the stops 124 and will reliably be separated from the suceeding wafer pieces. As the drum 105 revolves, the pressure-applying roll 131 is raised so that the rear ends of the wafer pieces can move freely under the roll 131 (FIG. 24c).

The illustrative embodiment shown in FIGS. 16 to 19 will be particularly desirable if the wafer pieces 106 laterally adjoin each other on the supporting plate 106.

It will be understood that the embodiment of the invention comprising a stationary vacuum drum may also be used to handle wafer pieces 101, which have on the support plate 106 a lateral spacing that is equal to the lateral spacing of the rib-molding depressions 102 of the casting molds 103. Such an apparatus will differ from the embodiment shown in FIGS. 16 to 19 only in that the track grooves for guiding the wafer piece carrying elements are parallel and have a lateral spacing that is equal to the lateral spacing of the rib-molding depressions 102 of the casting molds 103.

For a handling of wafer pieces which are fed on the support plate 106 with a lateral spacing which is equal to the lateral spacing of the rib-molding depressions 102 of the casting molds 103, the invention also provides a wafer piece carrier which revolves in the direction of movement of the casting molds (arrow B).

Illustrative embodiments of a transfer apparatus in accordance with the invention which comprises a revolving vacuum drum 205 are shown in FIGS. 20 to 23, wherein the design of the arresting device 109 is the same as in the embodiment shown in FIGS. 16 to 19.

In the drum 205 shown in these figures, the wafer sheet bearing surfaces 223 are constituted by flats formed on the drum shell 227 and are succeeded by respective projections 236, which are formed with stop faces 235 extending at right angles to the wafer piece bearing surfaces 223. The drum contains in its interior 217 a stationary partition 237, which disconnects the vacuum source from the vacuum ports 228 in that portion of the drum which in the direction of travel of the casting molds 203 (arrow B) extends from the upper apex of the drum to its lower apex. By that partition 237 the interior 217 of the drum is divided into two compartments. Only that compartment which adjoins the forward portion of the shell of the drum communicates with the vacuum pipe 229.

The partition 237 may be replaced by a covering member, which extends in a peripheral direction on the inside of the rear portion of the shell of the drum.

Figures 22, 23:
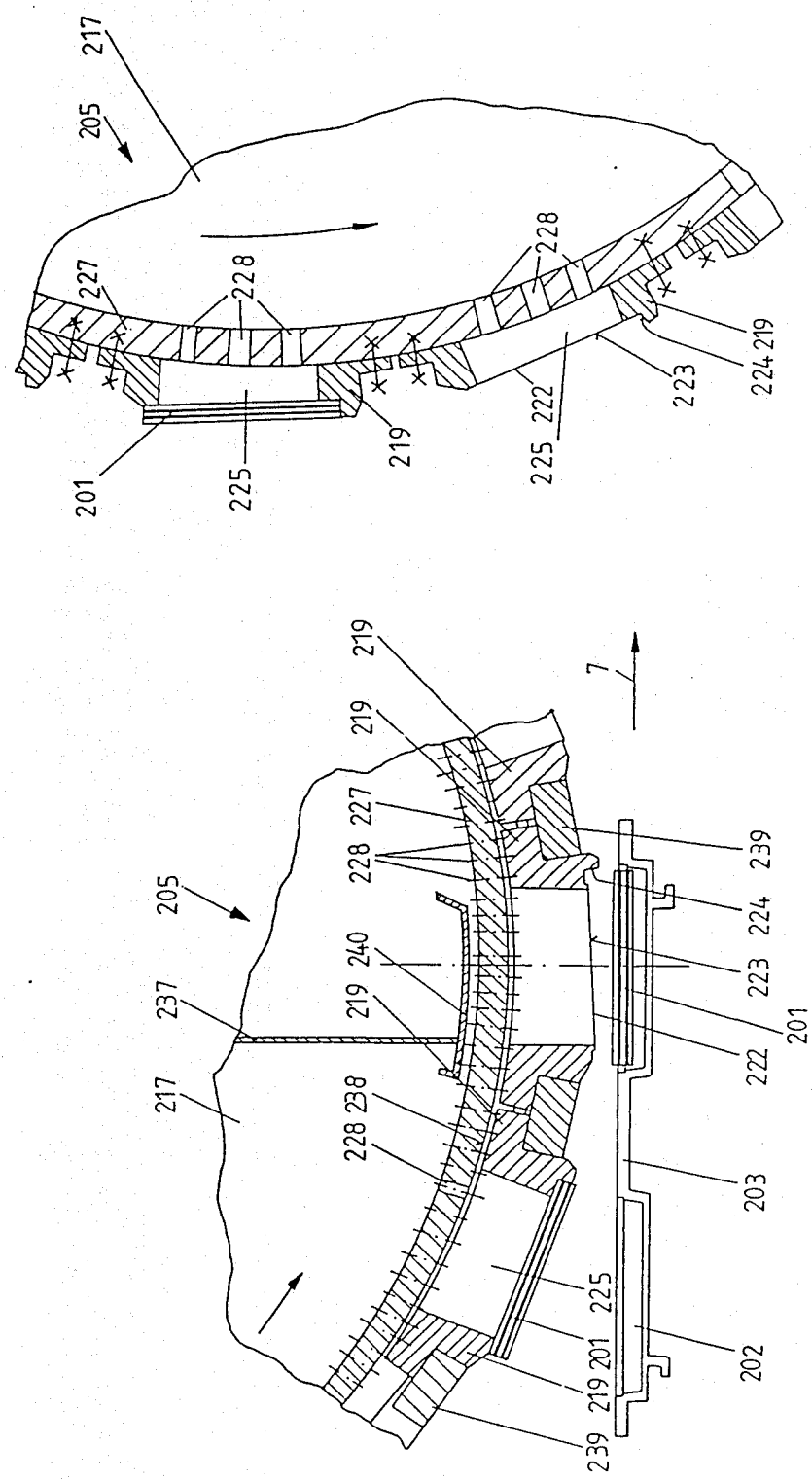
FIG. 22 is a sectional view taken on line B—B in FIG. 21.
FIG. 23 is a sectional view showing a drum shell of a further embodiment of the invention.

In the illustrative embodiment shown in FIGS. 21 and 22, the drum 205 is formed with grooves 238, which have the same lateral spacing as the rib-molding depressions 202 of the casting molds 203, and with vacuum ports 228, which extend through the shell 227 of the drum and open into said grooves. These grooves contain wafer piece carrying elements 219, which have a peripheral spacing that equals the longitudinal spacing of the rib-molding depressions 202 of the casting molds 203 and are secured to the drum 205 preferably by means of spacing elements 239 screw-connected to the drum. Those portions of the wafer piece carrying elements 219 which protrude from the grooves 238 are formed with the wafer piece bearing surfaces 223, which are provided with vacuum orifices 222, and are also formed with stops 224 succeeding said surfaces 223. Each wafer piece carrying element 219 is formed with a passage 225, which extends from a vacuum orifice 222 and communicates with a vacuum port 228 of the drum 205.

In the illustrative embodiment shown in FIG. 23, each wafer piece bearing surface 223, provided with a vacuum orifice 222, and the succeeding stop 224 are formed on a separate wafer piece carrying element 219, which is secured to the drum 205 and is formed with a passage 225, which extends from the vacuum orifice 222 and communicates with a vacuum port 228 of the drum 205. The wafer piece carrying elements 219 are arranged on the drum 205 with a lateral spacing which equals the lateral spacing of the rib-molding depressions 202 of the casting molds 203 and with a peripheral spacing which equals the longitudinal spacing of the rib-molding depressions 202 recesses of the casting molds 203.

To permit an adjustment of that location at which the wafer pieces 201 are released from the wafer piece bearing surfaces 223 at the lower apex of the drum to fall into the rib-molding depressions 202 of the casting molds 203, the drum may be provided on the inside of the drum shell 227 with a peripherally adjustable slider 240, which covers the adjacent openings of the vacuum ports 228 on the inside of the shell 227 of the drum.

If air is sucked at a volume rate which is sufficient to produce a vacuum by which even a single wafer piece 201 can be retained on a wafer piece bearing surface 223 whereas all other wafer piece bearing surfaces 223 are unoccupied, it will not be required to provide special means for use when the operation of the apparatus is to be initiated and discontinued.

If air is sucked at a lower volume rate, movable partitions may be provided in the interior of the drum in order to ensure that a vacuum will be applied on the inside of the drum only to those vacuum ports which communicate with vacuum orifices 222 in wafer piece bearing surfaces 223 occupied by a wafer piece 201.

When the operation of the apparatus has been initiated or is about to be discontinued, the vacuum applied to retain the wafer pieces 1 may be limited in the illustrative embodiment shown in FIGS. 16 to 19 by a partition in the interior 117 of the drum 105, which is rotatable about the axis of the drum and divides the interior into two compartments. The vacuum applied through vacuum pipe 129 may be shut off from the forward side of by this partition the drum in that portion thereof on which wafer pieces 101 are not yet disposed. As a result, no vacuum will be applied to the vacuum orifices 122 of the wafer piece bearing surfaces 123 which are not yet occupied by wafer pieces. The vacuum will not be applied until the partition 141, particularly that edge of the partition which slides on the inside surface of the drum, exposes the vacuum ports 128. When the operation of the apparatus has fully been initiated, the partition 141 will remain at rest adjacent to the lower apex of the drum so that the partition will then be ineffective (FIG. 16), or the partition may perform the same function as the adjustable slider 140 to define the time at which the wafer pieces 101 are released by the wafer piece bearing surfaces 123.

When the operation of the apparatus is to be discontinued, the rotation of the partition 141 from the position assumed at the end of the starting-up operation is resumed so that no vacuum will be applied at those wafer piece bearing surfaces 123 which are no longer occupied by wafer pieces 101.

The partition 141 may be replaced by a cover, which is peripherally slidable on the inside surface of the shell 127 of the drum.

We claim:

1. An apparatus for placing pre-cut wafer pieces into molding depressions of casting molds, which comprises
    (a) a molding-conveying means for continuously conveying the casting molds in a first plane of conveyance in a first direction of travel in such a manner that the casting mold depressions are arranged to form a plurality of longitudinal rows extending in the first direction of travel and a plurality of transverse rows extending transversely to the first direction of travel, the longitudinal rows having predetermined transverse spacings and the transverse rows having predetermined longitudinal spacings therebetween,
    (b) a separating device for feeding the pre-cut wafer pieces in a second plane of conveyance in a secnd direction of travel extending opposite to the first direction of travel, the second plane of conveyance being spaced a substantial distance above the first plane of conveyance, the separating device having
        (1) diverging guide channels extending in the second direction of travel and laterally moving the pre-cut wafer pieces apart until they have the same transverse spacings as the longitudinal rows of casting mold depressions, and
    (c) a transfer device adjoining the separating device in the second direction of travel for receiving the moved-apart pre-cut wafer pieces from the separating device and for placing said wafer pieces into the casting mold depressions, the transfer device bridging the space between the first and second planes of conveyance and comprising
        (1) a rotating wafer piece carrying drum arranged between the first and second planes of conveyance, the planes of conveyance extending substantially tangentially to the rotating drum and the drum having an axis of rotation extending perpendicularly to the first direction of travel and parallel to the first plane of conveyance, the drum having wafer piece retaining prongs distributed above the peripheral surface thereof and adapted to register with respective ones of the casting mold depressions, and
        (2) common drive means for the mold-conveying means and the rotating drum,
    (d) a support plate for the pre-cut wafer pieces arranged in the second plane of conveyance between the separating device and the rotating drum;
    (e) arresting means cooperating with the support plate for temporarily arresting the pre-cut wafer pieces on the support plate until respective ones of said prongs on the rotating drum have retained a leading transverse row of said pre-cut wafer pieces, the arresting means comprising a movable stop for arresting the leading transverse row of the wafer pieces moving on the support plate in the second direction of travel into engagement with the movable stop, and
    (f) a raking device arranged above the casting molds conveyed in the first plane of conveyance for stripping the pre-cut wafer pieces off the retaining prongs as they are moved into registry with respective ones of the casting mold depressions by the rotating drum and project thereinto.

2. The apparatus of claim 1, wherein the arresting means further comprises means for retaining the pre-cut wafer pieces trailing the leading transverse row of the wafer pieces engaged by the movable stop.

3. An apparatus for placing pre-cut wafer pieces into molding depressions of casting molds, which comprises
    (a) a mold-conveying means for continuously conveying the casting molds in a first plane of conveyance in a first direction of travel in such a manner that the casting mold depressions are arranged to form a plurality of longitudinal rows extending in the first direction of travel and a plurality of transverse rows extending transversely to the first direction of travel, the longitudinal rows having predetermined transverse spacings and the transverse rows having predetermined longitudinal spacings therebetween,
    (b) a separating device for feeding the pre-cut wafer pieces in a second plane of conveyance in a second direction of travel extending opposite to the first direction of travel, the second plane of conveyance being spaced a substantial distance above the first plane of conveyance, the separating device having
        (1) diverging guide channels extending in the second direction of travel and laterally moving the pre-cut wafer pieces apart until they have the same transverse spacings as the longitudinal rows of casting mold depressions, and (c) a transfer device adjoining the separating device in the second direction of travel for receiving the moved-apart pre-cut wafer pieces from the separating device and for placing said wafer pieces into the casting mold depressions, the transfer device bridging the space between the first and second planes of conveyance and comprising (1) a rotating wafer piece carrying vacuum drum arranged between the first and second planes of conveyance, the planes of conveyance extending substantially tangentially to the rotating drum and the drum having an axis of rotation extending perpendicularly to the first direction of travel and parallel to the first plane of conveyance, at least a portion of the interior of the drum being connected to a vacuum source and the drum having wafer piece retaining elements distributed about the periphery thereof and adapted to register with respective ones of the casting mold depressions, each wafer piece retaining element comprising a flat wafer piece bearing surface on the peripheral surface of the vacuum drum and communicating with an orifice leading to the interior of the drum for sucking a respective one of the wafer pieces against the flat bearing surface and a stop trailing the bearing surface in the direction of rotation of the vacuum drum for engaging the respective wafer piece, and (2) a common drive means for the mold-conveying means and the rotating drum.

4. The apparatus of claim 3, further comprising a support plate for the pre-cut wafer pieces arranged in the second plane of conveyance between the separating device and the rotating vacuum drum; and arresting means cooperating with the support plate for temporarily arresting the pre-cut wafer pieces on the support plate and comprising a movable means for arresting the wafer pieces moving on the support plate in the second direction of travel.

5. The apparatus of claim 4, further comprising a pressure-applying roll adjoining the support plate and arranged above the rotating vacuum drum for movement toward and away from the drum, the roll cooperating with respective ones of the bearing surfaces upon movement toward the drum.

6. The apparatus of claim 3, wherein the transfer device further comprises a pressure-applying roll adjoining the separating device and arranged above the rotating vacuum drum for movement toward and away from the drum, the roll cooperating with respective ones of the bearing surfaces upon movement toward the drum.

7. The apparatus of claim 3, wherein the wafer piece bearing surfaces are respective flattened portions of the peripheral surface of the vacuum drum and the stops are abutments projecting perpendicularly to the flattened portions from the peripheral vacuum drum surface.

8. The apparatus of claim 3, further comprising a slider arranged in the interior of the vacuum drum adjacent the first plane of conveyance for covering respective ones of the orifices leading from the bearing surfaces into the drum interior.

9. The apparatus of claim 8, wherein the slider is adjustable along the drum periphery.

10. The apparatus of claim 3, further comprising a stationary partition arranged in the interior of the vacuum drum for shutting off from the vacuum source the orifices in a region of the peripheral drum surface extending in the first direction of travel between the planes of conveyance.

11. The apparatus of claim 3, further comprising a partition arranged in the interior of the vacuum drum and rotatable about the axis of rotation for adjusting a region of the peripheral drum surface wherein the orifices are shut off from the vacuum source.

12. The apparatus of claim 11, wherein the partition is rotatable in the direction of rotation of the vacuum drum between the planes of conveyance.

13. The apparatus of claim 3, wherein the retaining elements further comprise knife edges at opposite sides of the orifices and projecting above the wafer piece bearing surfaces.

14. An apparatus for placing pre-cut wafer pieces into molding depressions of casting molds, which comprises (a) a mold-conveying means for continuously conveying the casting molds in a first plane of conveyance in a first direction of travel in such a manner that the casting mold depressions are arranged to form a plurality of longitudinal rows extending in the first direction of travel and a plurality of transverse rows extending transversely to the first direction of travel, the longitudinal rows having predetermined transverse spacings and the transverse rows having predetermined longitudinal spacings therebetween.

(b) a feeding device for feeding the pre-cut wafer pieces in a second plane of conveyance in a second direction of travel extending opposite to the first direction of travel, the pre-cut wafer pieces being arranged in abutting longitudinal rows extending in the second direction of travel and abutting transverse rows extending transversely thereto, the second plane of conveyance being spaced a substantial distance above the first plane of conveyance, and (c) a transfer device adjoining the feeding device in the second direction of travel for receiving the wafer pieces from the feeding device, for retaining the wafer pieces thereon and for placing said wafer pieces into the casting mold depressions, the transfer device bridging the space between the first and second planes of conveyance and comprising (1) a stationary drum-shaped conveyance surface extending concentrically about an axis between the first and second planes of conveyance, the conveyance surface having a plurality of guidance tracks adjoining in a direction extending transversely to the first direction of travel and extending concentrically about the axis, a respective one of the guidance tracks being associated with each longitudinal row of wafer pieces on the feeding device and each longitudinal row of casting mold depressions, (2) a plurality of wafer piece carrier elements displaceably arranged on the conveyance surface in each one of said guidance tracks and spaced from each other a distance corresponding to the spacing of the depressions in the longitudinal rows thereof, each one of the carrier elements having wafer piece retaining means, and (d) a means for displacing the wafer piece carrier elements in the guidance tracks along the stationary drum-shaped conveyance surface, the displacing means and the mold-conveying means being commonly driven.

15. The apparatus of claim 14, wherein the displacing means for the wafer piece carrier elements comprises a plurality of parallel bars extending transversely to the first and second directions of travel and movable along the stationary drum-shaped conveyance surface, respective ones of the bars being arranged between each two wafer piece carrier elements successively disposed in respective ones of the guidance tracks, the bars forming a concentric cage about the stationary drum-shaped conveyance surface and the guidance tracks thereof.

16. The apparatus of claim 15, wherein the bars are arranged to hold the wafer piece carrier elements in the guidance tracks and engage projections on the wafer piece carrier elements.

17. The apparatus of claim 14, wherein the feeding device has diverging guide channels extending in the second direction of travel and laterally moving the pre-cut wafer pieces apart until they have the same transverse spacings as the longitudinal rows of casting mold depressions, and the guidance tracks extend parallel to each other at spacings corresponding to the transverse spacings between the longitudinal rows of casting mold depressions.

18. The apparatus of claim 17, wherein the conveyance surface is formed by the periphery of a stationary drum and the axis extends perpendicularly to the first direction of travel and parallel to the first plane of conveyance.

19. The apparatus of claim 18, wherein the wafer piece retaining means are prongs arranged to spear respective ones of the wafer pieces, and the transfer device further comprises a support plate for the pre-cut wafer pieces arranged in the second plane of conveyance between the separating device and the stationary drum, arresting means cooperating with the support plate for temporarily arresting the pre-cut wafer pieces on the support plate until respective ones of said prongs have retained a leading transverse row of said pe-cut wafer pieces, the arresting means comprising a movable stop for arresting the leading transverse row of the wafer pieces moving on the support plate in the second direction of travel into engagement with the movable stop, and a raking device arranged above the casting molds conveyed in the first plane of conveyance for stripping the pre-cut wafer pieces off the retaining prongs as they are moved into registry with respective ones of the casting mold depressions by the bars and project thereinto.

20. The apparatus of claim 19, wherein the arresting means further comprises means for retaining the pre-cut wafer pieces trailing the leading transverse row of the wafer pieces engaged by the movable stop.

21. The apparatus of claim 18, wherein the stationary drum is a vacuum drum arranged between the first and second planes of conveyance, the planes of conveyance extending substantially tangentially to the drum, at least a portion of the interior of the drum being connected to a vacuum source and the guidance tracks having ports leading to the drum interior at least in a region of the guidance tracks extending in the second direction of travel from the second to the first plane of conveyance, and the retaining means of each wafer piece carrying element comprises a flat wafer piece bearing surface, an orifice passing through the element and communicating with a respective one of the ports leading to the interior of the drum for sucking a respective one of the wafer pieces against the flat bearing surface, and a stop trailing the bearing surface in the direction of travel for engaging the wafer piece.

22. The apparatus of claim 21, further comprising a support plate for the pre-cut wafer pieces arranged in the second plane of conveyance between the feeding device and the stationary vacuum drum, and arresting means cooperating with the support plate for temporarily arresting the pre-cut wafer pieces on the support plate and comprising a movable means for arresting the wafer pieces moving on the support plate in the second direction of travel.

23. The apparatus of claim 22, further comprising a pressure-applying roll adjoining the support plate and arranged above the stationary vacuum drum for movement toward and away from the drum, the roll cooperating with respective ones of the bearing surfaces.

24. The apparatus of claim 21, wherein the transfer device further comprises a pressure-applying roll adjoining the feeding device and arranged above the stationary vacuum drum for movement toward and away from the drum, the roll cooperating with respective ones of the bearing surfaces.

25. The apparatus of claim 21, further comprising a slider arranged in the interior of the vacuum drum adjacent the first plane of conveyance for covering respective ones of the ports leading into the drum interior.

26. The apparatus of claim 25, wherein the slider is adjustable along the drum periphery.

27. The apparatus of claim 21, further comprising a stationary partition arranged in the interior of the vacuum drum for shutting off from the vacuum source the ports in a region of the peripheral drum surface extending in the first direction of travel between the planes of conveyance.

28. The apparatus of claim 21, further comprising a partition arranged in the interior of the vacuum drum and rotatable about the axis of rotation for adjusting a region of the peripheral drum surface wherein the ports are shut off from the vacuum source.

29. The apparatus of claim 21, wherein the retaining means further comprises knife edges at opposite sides of the ports and projecting above the wafer piece bearing surfaces.

30. The apparatus of claim 14, wherein the feeding device feeds the pre-cut wafer pieces in abutting longitudinal rows, and the guidance tracks for the wafer piece carrying elements diverge from the first direction of travel to the mold-conveying means to have the same transverse spacings as the longitudinal rows of casting mold depressions.

31. The apparatus of claims 30, wherein the drum-shaped conveyance surface is formed on the periphery of a stationary drum and the axis extends perpendicularly to the first direction of travel and parallel to the first plane of conveyance.

32. The apparatus of claim 31, wherein the retaining means comprises prongs arranged to spear the wafer pieces, and the transfer device further comprises a support plate for the pre-cut wafer pieces arranged in the second plane of conveyance between the feeding device and the stationary drum, and arresting means cooperating with the support plate for temporarily arresting the pre-cut wafer pieces on the support plate and comprising a movable means for arresting the wafer pieces moving on the support plate in the second direction of travel, and a raking device arranged above the casting molds conveyed in the first plane of conveyance for stripping the pre-cut wafer pieces off the retaining prongs as they are moved into registry with respective ones of the casting mold depressions and project thereinto.

33. The apparatus of claim 32, wherein the arresting means further comprises means for retaining the pre-cut wafer pieces trailing the leading transverse row of the wafer pieces engaged by the movable stop.

34. The apparatus of claim 31, wherein the stationary drum is a vacuum drum arranged between the first and second planes of conveyance, the planes of conveyance extending substantially tangentially to the drum, at least a portion of the interior of the drum being connected to a vacuum source and the guidance tracks having ports leading to the drum interior at least in a region of the guidance tracks extending in the second direction of travel from the second to the first plane of conveyance, and the retaining means of each wafer piece carrying element comprises a flat wafer piece bearing surface, an orifice passing through the element and communicating with a respective one of the ports leading to the interior of the drum for sucking a respective one of the wafer pieces against the flat bearing surface, and a stop trailing the bearing surface in the direction of travel for engaging the wafer piece.

35. The apparatus of claim 34, wherein the transfer device further comprises a support plate for the pre-cut wafer pieces arranged in the second plane of conveyance between the feeding device and the stationary vacuum drum, and arresting means cooperating with the support plate for temporarily arresting the pre-cut wafer pieces on the support plate and comprising a movable means for arresting the wafer pieces moving on the support plate in the second direction of travel.

36. The apparatus of claim 35, further comprising a pressure-applying roll adjoining the support plate and arranged above the stationary vacuum drum for movement toward and away from the drum, the roll cooperating with respective ones of the bearing surfaces.

37. The apparatus of claim 35, wherein the transfer device further comprises a pressure-applying roll adjoining the feeding device and arranged above the stationary vacuum drum for movement toward and away from the drum, the roll cooperating with respective ones of the bearing surfaces.

38. The apparatus of claim 31, further comprising a slider arranged in the interior of the vacuum drum adjacent the first plane of conveyance for covering respective ones of the ports leading into the drum interior.

39. The apparatus of claim 38, wherein the slider is adjustable along the drum periphery.

40. The apparatus of claim 34, further comprising a stationary partition arranged in the interior of the vacuum drum for shutting off from the vacuum source the ports in a region of the peripheral drum surface extending in the first direction of travel between the planes of conveyance.

41. The apparatus of claim 34, further comprising a partition arranged in the interior of the vacuum drum and rotatable about the axis of rotation for adjusting a region of the peripheral drum surface wherein the ports are shut off from the vacuum source.

42. The apparatus of claim 31, wherein the retaining means further comprises knife edges at opposite sides of the ports and projecting above the wafer piece bearing surfaces.

* * * * *